US010695847B2

(12) United States Patent
Laliberte

(10) Patent No.: US 10,695,847 B2
(45) Date of Patent: Jun. 30, 2020

(54) SAW HEIGHT ADJUSTMENT MECHANISM HAVING A FLEXIBLE SHAFT

(71) Applicants: Robert Bosch Tool Corporation, Broadview, IL (US); Robert Bosch GmbH, Stuttgart (DE)

(72) Inventor: Eric R Laliberte, Naperville, IL (US)

(73) Assignees: Robert Bosch Tool Corporation, Broadview, IL (US); Robert Bosch GmbH, Stuttgart (DE)

(*) Notice: Subject to any disclaimer, the term of this patent is extended or adjusted under 35 U.S.C. 154(b) by 0 days.

(21) Appl. No.: 15/948,725

(22) Filed: Apr. 9, 2018

(65) Prior Publication Data

US 2019/0308257 A1  Oct. 10, 2019

(51) Int. Cl.
*B23D 45/06* (2006.01)
*F16C 1/06* (2006.01)

(52) U.S. Cl.
CPC .............. *B23D 45/068* (2013.01); *F16C 1/06* (2013.01)

(58) Field of Classification Search
CPC .... B23D 45/068; B23D 45/06; B23D 45/061; B23D 45/062; B23D 45/063; B23D 45/065; B23D 45/066; B23D 45/067; B23D 47/025; Y10T 83/773; F16C 1/00; F16C 1/08
See application file for complete search history.

(56) References Cited

U.S. PATENT DOCUMENTS

| 3,146,576 A | * | 9/1964 | Wezel | B21F 17/00 156/155 |
| 5,340,129 A | | 8/1994 | Wright | |
| 5,474,499 A | | 12/1995 | Olson | |
| 5,820,464 A | * | 10/1998 | Parlato | F16C 1/04 464/58 |
| 6,220,372 B1 | | 4/2001 | Cherry | |
| 6,267,679 B1 | * | 7/2001 | Romano | A61B 17/1642 464/58 |
| 7,382,104 B2 | | 6/2008 | Jacobson et al. | |
| 8,616,104 B2 | | 12/2013 | Frolov et al. | |

(Continued)

FOREIGN PATENT DOCUMENTS

| GB | 403016 A | * | 12/1933 | ................ F16C 1/02 |
| GB | 1027928 | * | 4/1966 | |
| GB | 2015699 A | * | 9/1979 | ................ F16C 1/02 |

*Primary Examiner* — Jennifer B Swinney
(74) *Attorney, Agent, or Firm* — Maginot, Moore & Beck LLP

(57) ABSTRACT

A table saw includes a table assembly having a top surface, a cutting assembly, and an adjustment assembly. The cutting assembly is arranged below the table assembly and is movable relative to the top surface. The adjustment assembly is operably connected to the cutting assembly and includes an input member, an output member, and a flexible shaft. The output member is operably connected to the cutting assembly and is configured such that rotation of the output member causes the cutting assembly to move relative to the table top surface. The flexible shaft has a nonlinear central axis, a first end operably connected to the input member, and a second end operably connected to the output member. The flexible shaft is configured such that rotation of the input member causes rotation of the first and second ends, and rotation of the second end causes rotation of the output member.

20 Claims, 10 Drawing Sheets

(56) References Cited

U.S. PATENT DOCUMENTS

| | | |
|---|---|---|
| 2005/0092155 A1 | 5/2005 | Phillips et al. |
| 2006/0191393 A1* | 8/2006 | Zhang .................. B23D 45/063 83/477.1 |
| 2006/0283023 A1 | 12/2006 | Hesson |
| 2007/0079683 A1* | 4/2007 | Chen .................... B23D 45/068 83/581 |
| 2007/0093840 A1 | 4/2007 | Pacelli et al. |
| 2008/0115642 A1* | 5/2008 | Chang .................... B23D 45/06 83/435.27 |
| 2008/0257606 A1 | 10/2008 | Teixeira et al. |
| 2009/0191974 A1 | 7/2009 | Weissenbock et al. |
| 2011/0048188 A1* | 3/2011 | Mehta .................. B23D 45/067 83/58 |
| 2011/0115268 A1 | 5/2011 | Maierhofer et al. |
| 2012/0321492 A1 | 12/2012 | Zhu et al. |

* cited by examiner

SAW HEIGHT ADJUSTMENT MECHANISM HAVING A FLEXIBLE SHAFT

TECHNICAL FIELD

This invention relates to power equipment, and in particular to a table saw.

BACKGROUND

Table saws are used in a variety of diverse applications for cutting wood products, often in the construction industry. In particular, in settings such as construction jobsites and machine shops, table saws are used to cut and shape a wide range of wood types and piece shapes. For example, framers use table saws for rough-cutting lumber, while finishing carpenters use such saws for making precise rip and miter cuts.

Such table saws are often required to suit a range of cutting and machining requirements, as they are capable of cutting workpieces at varying angles and also adjusting in height. Height adjustable table saws are particularly beneficial in that the height of the cutting blade can be raised and lowered in order to accommodate a wide variety of machining requirements.

Height adjustable table saws typically include height adjustment mechanisms configured to raise and lower the cutting blade of the table saw. For example, one such arrangement includes a pair of bevel gears having involute teeth. In this example, one of the bevel gears is connected to a horizontally oriented handle wheel while a second bevel gear is connected to a vertical shaft that is connected via a cam mechanism to the cutting blade. The gear teeth of the two bevel gears mesh with one another in order to transfer rotation of the handle wheel into a vertical movement of the cutting blade.

During a machining operation, dust and debris from the cut workpiece are produced as byproducts. The dust and debris can become lodged inside the involute teeth of the bevel gears. As a result, continued operation of the bevel gears causes the dust and debris to accumulate and become compressed between the involute teeth. Operation of the height adjustment mechanism can be compromised as a result of the dust and debris accumulation, which can cause malfunctions in the mechanism and, in some instances, damage to the bevel gears.

One current solution for reducing dust and debris contamination issues in the bevel gears is to cease operation of the table saw and clean the gear assembly to remove dust, wood chips, and other debris from the bevel gears. However, this process can be time consuming and reduces the efficiency of the table saw. Another possible solution includes mounting the gear of the vertical shaft above the gear of the horizontal shaft such that the top gear creates a "canopy" over the lower gear, thus reducing dust and debris build-up on the gears. However, the canopy only slows the build-up of dust and debris. Eventually, the dust and debris will accumulate and compromise the rotation of the gears and thus the efficiency of the device.

Therefore, an improved blade height adjustment mechanism would be advantageous.

SUMMARY

In one embodiment, a table saw includes a table assembly, a cutting assembly, and a height adjustment assembly. The table assembly includes a table top surface that defines a blade opening. The cutting assembly is arranged below the table assembly and is configured to be movable relative to the table top surface. The height adjustment assembly is operably connected to the cutting assembly and includes an input member, an output member, and a flexible shaft. The output member is operably connected to the cutting assembly and is configured such that rotation of the output member causes the cutting assembly to move relative to the table top surface. The flexible shaft has a nonlinear central axis, a first end operably connected to the input member, and a second end operably connected to the output member. The flexible shaft is configured such that rotation of the input member causes rotation of the first end and the second end of the flexible shaft, and rotation of the second end of the flexible shaft causes rotation of the output member.

In some embodiments of the table saw, rotation of the input member causes rotation of the first end of the flexible shaft about a first rotational axis, and rotation of flexible shaft causes rotation of the second end of the flexible shaft about a second rotational axis.

In another embodiment of the table saw, the first rotational axis is oblique to the second rotational axis.

Additionally, in some embodiments of the table saw, the first rotational axis and the second rotational axis do not intersect.

In further embodiments of the table saw, the table saw further includes a bevel adjustment member configured to adjust a bevel angle of the cutting assembly. The first rotational axis is spaced apart from the bevel adjustment member.

In some embodiments of the table saw, the first end of the flexible shaft is fixedly attached to the input member and the second end is fixedly attached to the output member.

In another embodiment of the table saw, the cutting assembly includes a translation member operably connected to the output member. The translation member is configured to convert the rotation of the output member into translational movement of the cutting assembly.

Additionally, in some embodiments of the table saw, the flexible shaft includes a primary central wire, at least one first plurality of coils, and at least one second plurality of coils. The central wire extends from the first end to the second end of the flexible shaft. The at least one first plurality of coils is wound around the central wire in a first winding direction, and the at least one second plurality of coils is wound around the at least one first plurality of coils in a second winding direction.

In further embodiments of the table saw, the at least one first plurality of coils is right-hand wound, and the at least one second plurality of coils is left-hand wound.

In another embodiment of the table saw, rotation of the flexible shaft causes the at least one first plurality of coils to generate a clamping force on the primary central wire, and rotation of the flexible shaft causes the at least one second plurality of coils to generate a clamping force on the at least one first plurality of coils.

In some embodiments of the table saw, the flexible shaft includes a first plurality of coils.

In further embodiments of the table saw, the first plurality of coils includes a first plurality of clamping coils, a second plurality of clamping coils, and a plurality of elongated coils. The first plurality of clamping coils is wound at a first end region of the flexible shaft and has a first inner coil diameter. The second plurality of clamping coils is wound at a second end region of the flexible shaft and has a second inner coil diameter. The plurality of elongated coils is wound between the first plurality of clamping coils and the second plurality of clamping coils and has a third inner coil diameter that is greater than the first and second inner coil diameters.

In another embodiment, a height adjustment assembly for a table saw includes an input member, an output member, and a flexible shaft. The output member is operably connected to a cutting assembly of the table saw and is configured such that rotation of the output member causes the cutting assembly to move relative to a table top surface of the table saw. The flexible shaft has a nonlinear central axis, a first end operably connected to the input member, and a second end operably connected to the output member. The flexible shaft is configured such that rotation of the input member causes rotation of the first end and the second end of the flexible shaft, and rotation of the second end of the flexible shaft causes rotation of the output member.

Additionally, in some embodiments of the height adjustment assembly, rotation of the input member causes rotation of the first end of the flexible shaft about a first rotational axis, and rotation of flexible shaft causes rotation of the second end of the flexible shaft about a second rotational axis that is not parallel to the first rotational axis.

In further embodiments of the height adjustment assembly, the first rotational axis is oblique to the second rotational axis.

In another embodiment of the height adjustment assembly, the first rotational axis and the second rotational axis do not intersect.

In some embodiments of the height adjustment assembly, the height adjustment assembly further includes a bevel adjustment member configured to adjust a bevel angle of the cutting assembly. The first rotational axis is spaced apart from the bevel adjustment member.

Additionally, in further embodiments of the height adjustment assembly, the flexible shaft includes a primary central wire, at least one first plurality of coils, and at least one second plurality of coils. The central wire extends from the first end to the second end of the flexible shaft. The at least one first plurality of coils is wound around the central wire in a first winding direction, and the at least one second plurality of coils is wound around the at least one first plurality of coils in a second winding direction.

In another embodiment of the height adjustment assembly, rotation of the flexible shaft causes the at least one first plurality of coils to generate a clamping force on the primary central wire, and rotation of the flexible shaft causes the at least one second plurality of coils to generate a clamping force on the at least one first plurality of coils.

In a further embodiment, a method for adjusting a height of a cutting assembly of a table saw includes rotating an input member of a height adjustment assembly, rotating an output member of the height adjustment assembly, and moving the cutting assembly relative to a table top surface of the table saw. Rotating the input member causes rotation of a first end and second end of a flexible shaft of the height adjustment assembly, the flexible shaft having a nonlinear central axis. The first end of the flexible shaft is operably connected to the input member and the second end of the flexible shaft is operably connected to the output member. The output member is operably connected to the cutting assembly. Rotating the output member is carried out via the rotation of the second end of the flexible shaft. Moving the cutting assembly relative to the table top surface of the table saw is carried out via the rotation of the output member.

DETAILED DESCRIPTION

Figure 1:
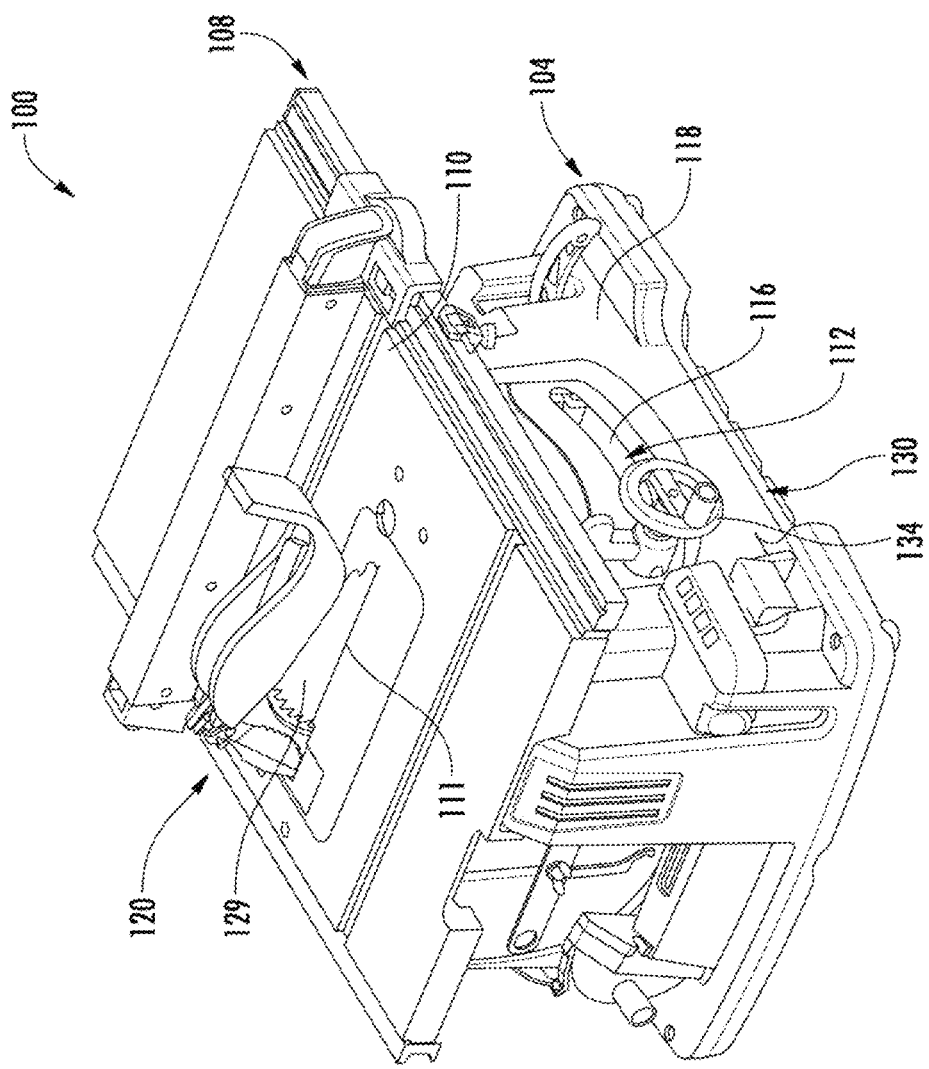
FIG. 1 is a front perspective view of a table saw assembly having a saw blade height adjustment mechanism.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

FIG. 1 illustrates a table saw assembly 100 that has a height adjustment assembly 130. The table saw assembly 100 includes a base frame 104, a main table 108, a cutting assembly 120, and an undercarriage 124. The base frame 104 supports the components of the table saw assembly 100 and defines an enclosure space 112 in which at least some of the components of the cutting assembly 120 and the height adjustment assembly 130 are mounted and housed. The base frame 104 includes a front surface 118 defining an arc-shaped aperture 116, through which a portion of the height adjustment assembly 130 protrudes so as to be accessible to a user of the table saw assembly 100.

The main table 108 is supported on the base frame 104 above the cutting assembly 120 and includes a generally planar upper surface 110 that is configured to support a workpiece during cutting and thus serves as a workpiece support surface. The main table 108 defines a blade opening 111 in the upper surface 110.

Figure 2:
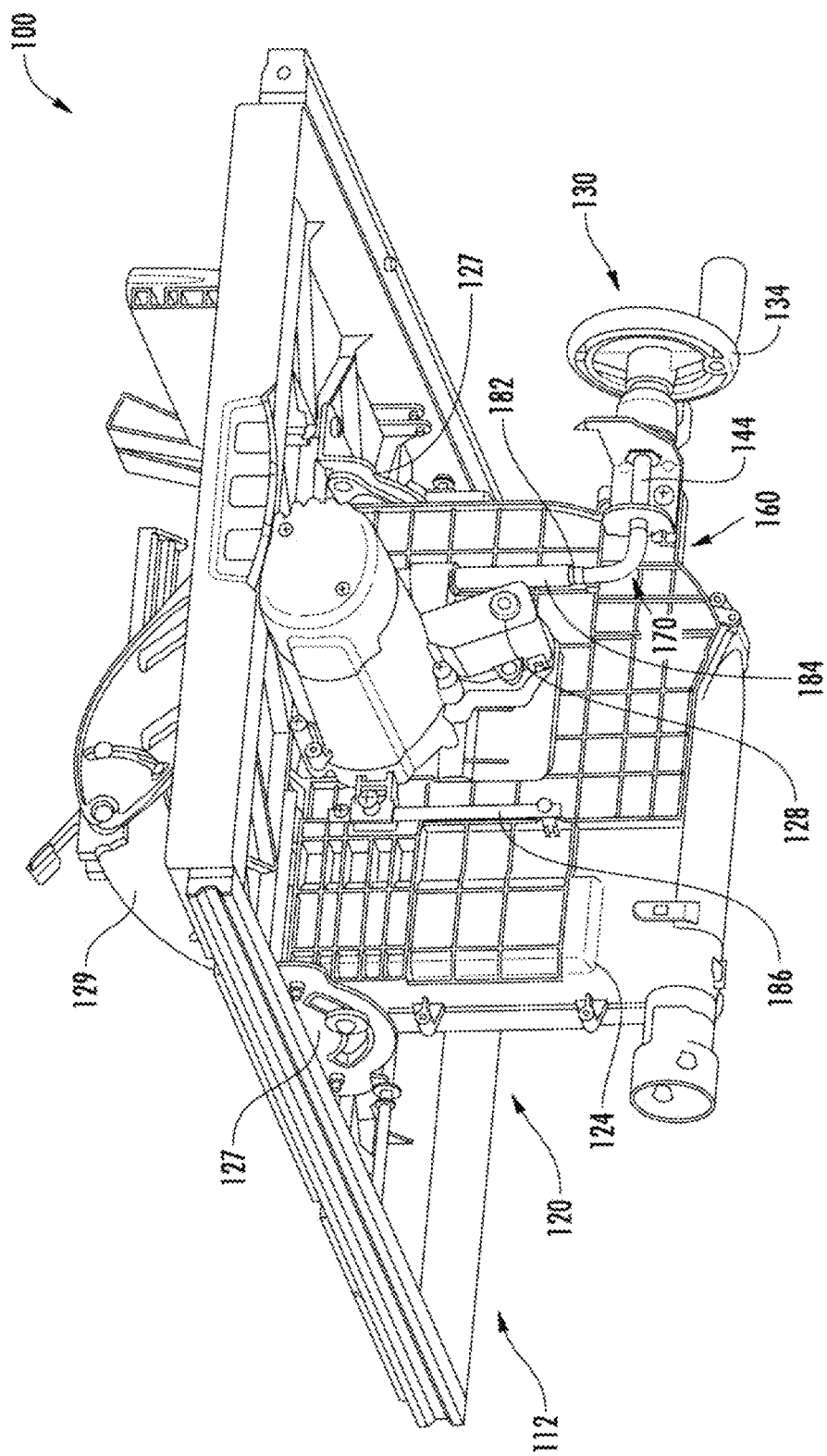
FIG. 2 is a cut-away perspective view of the table saw assembly of FIG. 1 with a base frame of the table saw removed for clarity.

As illustrated in FIG. 2, the cutting assembly 120 includes a motor 128 movably mounted on the undercarriage 124, and a circular saw blade 129 configured to be fixed to an arbor shaft (not shown). The motor 128 is operatively connected to the arbor shaft via, for example, a power train assembly, to rotate the arbor shaft, which in turn produces a rotational cutting movement of the circular saw blade 129.

The undercarriage 124 of the table saw assembly 100 is mounted on a pair of supports 127 on the underside of the main table 108 and extends downwardly from the main table 108 into the enclosure space 112. The undercarriage 124 defines an interior space that encloses a bottom portion of the circular saw blade 129. The undercarriage 124 is further configured to pivot about a pivot axis, which extends longitudinally along the blade opening 111, in order to adjust a bevel cutting angle of the circular saw blade 129. The bevel cutting angle may be adjusted by pivoting the undercarriage 124 via lateral movement of a height adjustment wheel 134 that is accessible to the user, or another handle element attached to the undercarriage 124.

The motor 128 is mounted on an outer surface of the undercarriage 124 and is operably connected to the circular saw blade 129. As will be described in detail below, the motor 128 is mounted to the outer surface of the undercarriage 124 in such a way that the motor 128 may be raised or lowered in a vertical direction H relative to the undercarriage 124 in response to a user operating the height adjustment assembly 130.

Figure 3:
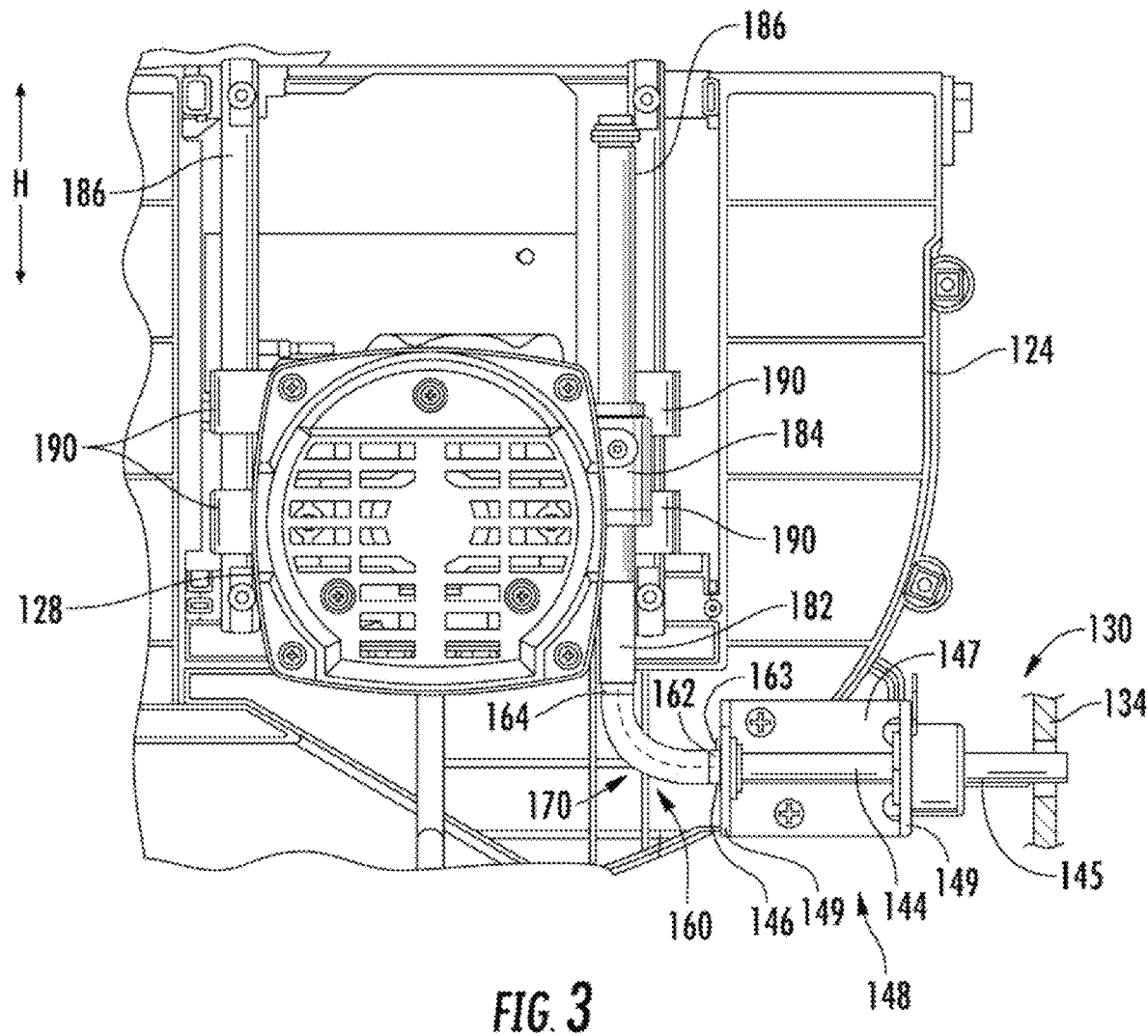
FIG. 3 is a side elevation view of the saw blade height adjustment mechanism of the table saw assembly of FIG. 1.
Figure 4:
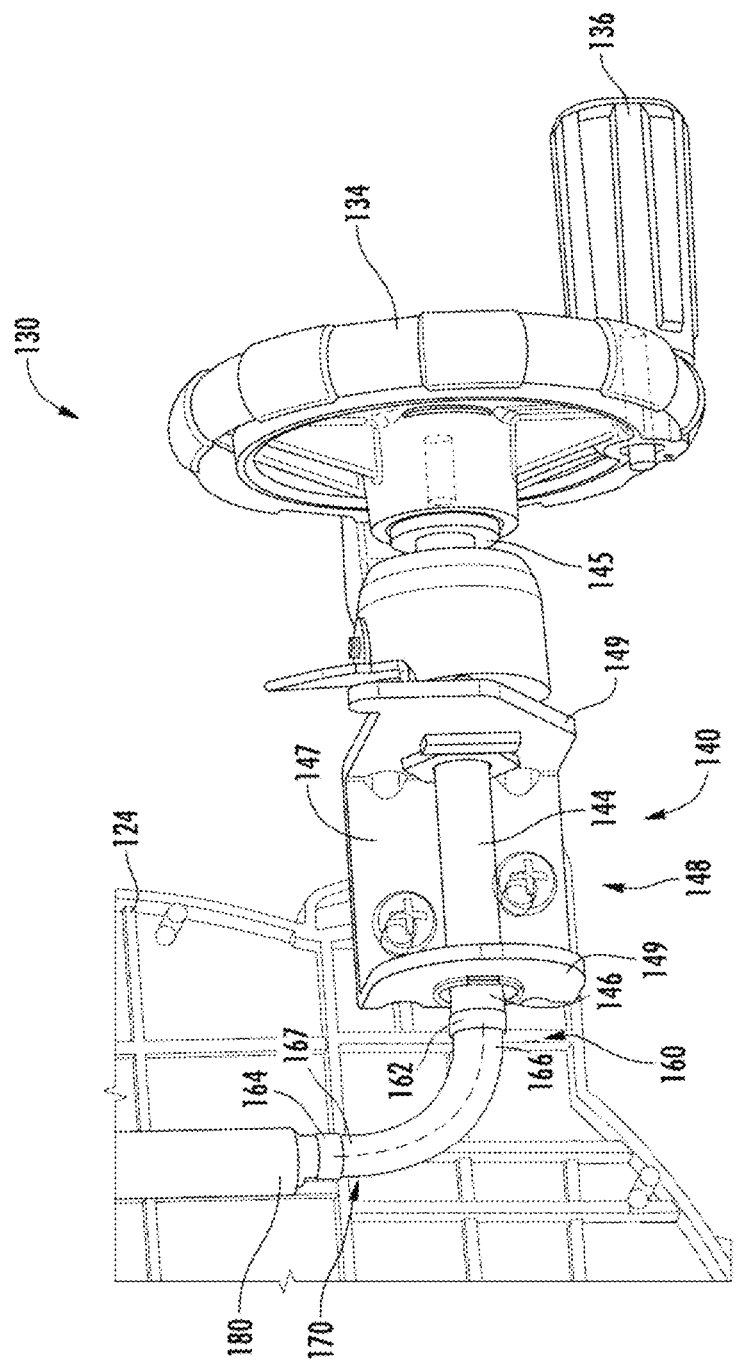
FIG. 4 is a perspective view of the saw blade height adjustment mechanism of FIG. 3.

With continuing reference to FIG. 2, and further reference to FIGS. 3 and 4, the height adjustment assembly 130 includes a horizontal rod subassembly 140, a flexible shaft subassembly 160, and a vertical movement subassembly 180. The horizontal rod subassembly 140 includes a rod 144 (which can also be referred to as an input member), a mounting plate 148, and a height adjustment wheel 134. The rod 144 is rotatably supported by the mounting plate 148, which includes a planar mounting portion 147 and two opposite end portions 149 that extend generally perpendicularly from the surface of the mounting portion 147. The mounting portion 147 is securely fastened to the undercarriage 124 with screws or other suitable fasteners. The two opposite end portions 149 each define a rod bearing hole that receives a portion of the rod 144 so as to support the rod 144 and allow the rod 144 to rotate within the mounting plate 148.

The rod 144 includes an exterior end 145 and an interior end 146. The rod 144 extends in a horizontal axial direction through the two rod bearing holes in the opposite end portions 149 of the mounting plate 148. The exterior end 145 of the rod 144 protrudes beyond the outermost end portion 149 of the mounting plate 148 and through the arc-shaped aperture 116 of the base frame 104. The height adjustment wheel 134 has a handle portion 136 and is fixedly attached to the exterior end 145 of the rod 144 that extends through the arc-shaped aperture 116 so that the height adjustment wheel 134 is accessible to a user of the table saw assembly 100.

Figure 5:
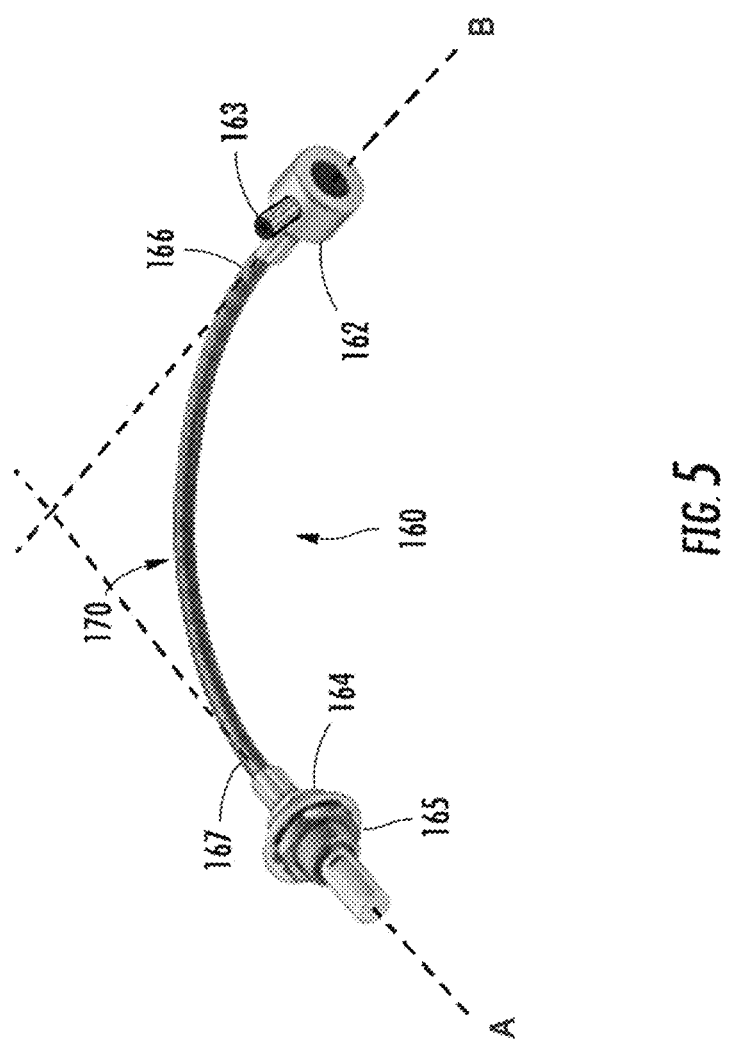
FIG. 5 is a perspective view of a flexible shaft of the saw blade height adjustment mechanism of FIG. 3.

Referring now to FIGS. 3-5, the flexible shaft subassembly 160 of the height adjustment assembly 130 includes a flexible shaft 170, a first hub member 162, and a second hub member 164. The first hub member 162 of the flexible shaft subassembly 160 is fixedly attached to the innermost end 146 of the rod 144 opposite of the height adjustment wheel 134 and is configured to rotate with the rod 144. The opposing side of the first hub member 162 is fixedly attached to a first end 166 of the flexible shaft 170. Thus, rotation of the rod 144 causes rotation of the first end 166 of the flexible shaft 170.

In the illustrated embodiment, the first hub member 162 is fixed to the rod 144 with a pin 163 that extends through a hole in the body of the first hub member 162 and into a corresponding recess in the rod 144. In other embodiments, the first hub member 162 may be fixed to the rod 144 by welding the first hub member 162 to the rod 144, threadedly engaging the first hub member 162 to the rod 144, or via other suitable fastening methods. The reader should appreciate that the first end 166 of the flexible shaft 170 may rotate at the same or different rotational speed as compared to the rod 144, and in some embodiments, the first hub member 162 may have a different first rotational axis A than the rod 144.

As illustrated in FIG. 5, the flexible shaft subassembly 160 includes the flexible shaft 170. The first rotational axis A is defined by the first end 166 of the flexible shaft 170. The flexible shaft further includes a second end 167 which has a second rotational axis B. As shown in FIG. 5, the first rotational axis A is oblique to the second rotational axis B, although in other embodiments, the first rotational axis A may be oriented parallel or perpendicular to the second rotational axis B. Oblique should be understood to mean neither parallel nor perpendicular. Furthermore, as shown in FIG. 5, the first rotational axis A intersects the second rotational axis B, although in some embodiments, the first rotational axis A is in a different plane than the second rotational axis B, and thus does not intersect the second rotational axis B.

Figure 6B:
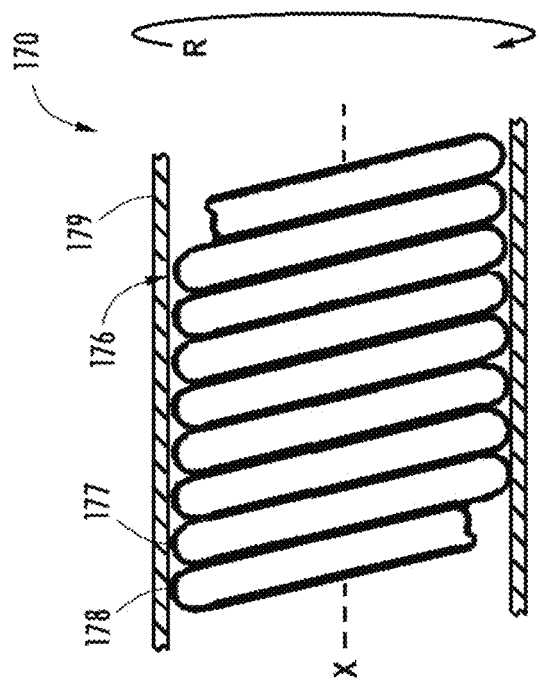
FIG. 6B is a side elevation view of a flexible shaft of the saw blade height adjustment mechanism of FIG. 3.
Figure 6A:
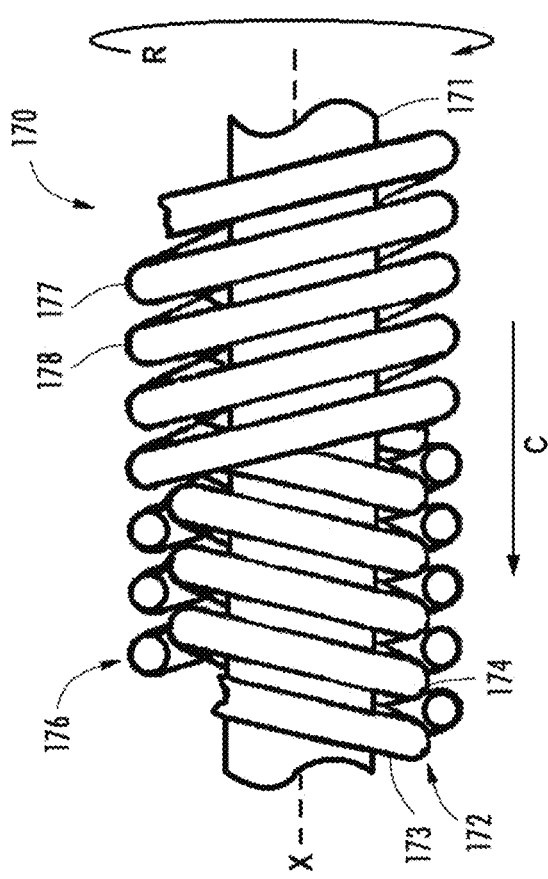
FIG. 6A is a cut-away side elevation view of a flexible shaft of the saw blade height adjustment mechanism of FIG. 3.

As illustrated in FIGS. 6A and 6B, the flexible shaft 170 includes a central wire 171, at least a first coil layer 172 (which can also be referred to as a first plurality of coils) and a second coil layer 176 (which can also be referred to as a second plurality of coils), and an outer sleeve 179. The central wire 171 runs along a central axis X of the flexible shaft 170 and serves as a support for the surrounding first and second coil layers 172, 174. The central wire 171 is preferably flexible, or in other words has a nonlinear central axis X, so as to permit axial bending of the flexible shaft 170. The nonlinear central axis X is an axis that is curved at least in one region relative to the first and second ends 166, 167 of the flexible shaft 170. The central wire 171 extends along the entirety of the length of the flexible shaft 170 such that each end of the central wire 171 terminates at the first hub member 162 and the second hub member 164, respectively.

Referring specifically to FIG. 6A, the first coil layer 172 includes at least a first coil wire 173 and a second coil wire 174. The first and second coil wires 173, 174 are configured as wound helical springs, and are wound in a first winding direction of the flexible shaft 170. The first coil wire 173 is wound in parallel with the second coil wire 174, such that the space between each coil of the first coil wire 173 is filled with at least a coil of the second coil wire 174, and vice versa. The first and second coil wires 173, 174 are arranged parallel and adjacent to one another such that each coil wire of the first coil wire 173 is in direct contact with each coil of the second coil wire 174. Thus, there is no space or gap between the first and second coil wires 173, 174 in the axial direction. As a result, the parallel winding of the first and second coil wires 173, 174 increases the torsional stiffness of the first coil layer 172.

The first and second coil wires 173, 174 of the first coil layer 172 are wound around the central wire 171. Although FIG. 6A shows the first coil layer 172 as being spaced apart from the central wire 171 in a radial direction for visual clarity, the first and second coil wires 173, 174 are wound directly onto and around the outer circumferential surface of the central wire 171. Thus, there is no space or gap between the central wire 171 and the first coil layer 172 in the radial direction. This further increases the torsional stiffness of the flexible shaft 170.

The reader should appreciate that, although the embodiment shown in FIG. 6A includes two coil wires 173, 174, other embodiments of the flexible shaft 170 include a greater number of coil wires in order to further increase the torsional stiffness of the first coil layer 172. For example, in various embodiments, the first coil layer 172 includes between three and five coil wires wound in parallel. When a greater number of coil wires are used in the assembly, the spacing between each coil must be accounted for to allow for a greater number of other coil wires to be wound in parallel. When two coil wires 173, 174 are used, as shown in FIGS. 6A and 6B, there are two coils per unit length of the coil wires 173, 174. When using, for example, five coil wires, there are five coils per unit length of coil wires.

Referring again to FIG. 6A, the second coil layer 176 includes at least a third coil wire 177 and a fourth coil wire 178. The third and fourth coil wires 177, 178 are configured as wound helical springs similarly to the first and second coil wires 173, 174 of the first coil layer 172, and are wound in a second winding direction of the flexible shaft 170. The second winding direction is a winding direction of the coils that is opposite of the first winding direction of the coils. For example, as shown in FIG. 6A, the coils of the second coil layer 176 are wound clockwise in an axial direction C, or right-hand wound, and the coils of the first coil layer 172 are wound counter-clockwise in the axial direction C, or left-hand wound. Thus, in this example, the first winding direction corresponds to the winding direction of the second coil layer 176, and the second winding direction corresponds to the opposite winding direction of the first coil layer 172. In other embodiments, the winding directions are reversed for each coil layer 172, 176.

The third coil wire 177 is wound in parallel with the fourth coil wire 178, such that the space between each coil of the third coil wire 177 is filled with at least a coil of the fourth coil wire 178, and vice versa. The third and fourth coil wires 177, 178 are arranged parallel and adjacent to one another such that each coil wire of the third coil wire 177 is in direct contact with each coil of the fourth coil wire 178. Thus, there is no space or gap between the third and fourth coil wires 173, 174 in the axial direction. As a result, the parallel winding of the third and fourth coil wires 177, 178 increases the torsional stiffness of the second coil layer 176.

The third and fourth coil wires 177, 178 of the second coil layer 176 are wound around the first coil layer 172. Although FIG. 6A shows the second coil layer 176 as being slightly spaced apart from the first coil layer 172 in a radial direction for visual clarity, the third and fourth coil wires 177, 178 are wound directly onto and around the outer circumferential surface of the first and second coil wires 173, 174 of the first coil layer 172. Thus, there is no space or gap between the first and second coil layers 172, 176 in the radial direction. This further increases the torsional stiffness of the flexible shaft 170. The reader should appreciate that, although the embodiment shown in FIG. 6A includes two coil wires 177, 178, other embodiments of the flexible shaft 170 include a greater number of coil wires in order to further increase the torsional stiffness of the second coil layer 176. For example, in various embodiments, the second coil layer 176 includes between three and five coil wires wound in parallel. When a greater number of coil wires are used in the assembly, the spacing between each coil must be accounted for to allow for a greater number of other coil wires to be wound in parallel. The reader should also appreciate that, although the embodiment shown in FIG. 6A shows the first and second coil layers 172, 176 having an equal number of coil wires 173, 174, 177, 178, the first and second coil layers 172, 176 may differ in the number of coil wires in each layer.

In the embodiment illustrated in FIGS. 6A and 6B, the flexible shaft 170 is configured to rotate in a first rotational direction R around the central axis X. When the flexible shaft 170 is rotated in the first rotational direction R, the central wire 171, the first coil layer 172, and the second coil layer 176 also rotate in the first rotational direction R.

Rotation of the first coil layer 172 in the first rotational direction R causes the first and second coil wires 173, 174 to tend to expand in the radial direction due to the first and second coil wires 173, 174 being wound in the first winding direction. Conversely, rotation of the second coil layer 176 in the first rotational direction R causes the third and fourth coil wires 177, 178 to tend to contract in the radial direction (which can also be referred to as a clamping force) due to the third and fourth coil wires 177, 178 being wound in the axial direction C. During rotation of the flexible shaft 170 in the first rotational direction R, neither the first or second coil layers 172, 176 is able to expand or contract, respectively, because the second coil layer 176 prevents the expansion of the first coil layer 172 and the first coil layer 172 prevents contraction of the second coil layer 176. The first coil layer 172 also contracts radially toward the central wire 171. The interactions between the layers 172, 176 and the central wire 171 greatly increase the torsional stiffness of the flexible shaft 170 due to the various layers contracting or clamping against adjacent layers, while at the same time permitting axial bending of the shaft 170.

Although the illustrated embodiment includes two coil layers 172, 176, other embodiments of the flexible shaft 170 include a greater number of coil layers in order to further increase the torsional stiffness of the shaft 170. For example, in various embodiments, the flexible shaft includes between three and five coil layers. Each coil layer is configured similarly to the first and second coil layers 172, 176 described above. Each coil layer includes a plurality of coil wires wound in parallel, and each coil layer is wound in a direction opposite to the adjacent coil layers. In operation, each coil layer either tends to expand or contract based on the rotational direction R of the flexible shaft, while at the same time preventing either the expansion or contraction of the adjacent coil layers. The additional coil layers clamping against adjacent coil layers further increases the torsional stiffness of the flexible shaft in comparison to a flexible shaft 170 having two coil layers.

In one embodiment, the central wire 171 and the coil wires 173, 174, 177, 178 of the flexible shaft 170 are formed by a winding machine, a braiding machine, an auto coiler, or another suitable method of manufacturing wound helical springs. Additionally, in some embodiments, the coil wires are formed of aluminum, hardened steel, or another metal or metal alloy. The coil layers, although would adjacent to and around one another in opposing directions, should not be bonded to each other, so as to allow for axial bending of the flexible shaft. In some embodiments, the diameters of the coil layers 172, 176 are equal to each other, although in other embodiments the diameter of each layer is different so as to create distinct torsional strength qualities.

Referring specifically to FIG. 6B, the outer sleeve 179 of the flexible shaft 170 is arranged to surround the outer circumferential surface of the second coil layer 176. The outer sleeve 179 is formed of a flexible material, for example a flexible plastic such as polypropylene or low-density polyethylene. Thus, the outer sleeve 179 is able to axially bend with the first and second coil layers 172, 176, while also preventing the second coil layer 176 from dilating if the flexible shaft 170 is rotated in a rotational direction that causes dilation of the outer second coil layer 176. Furthermore, the outer sleeve 179 prevents dust and debris caused by a machining process of the table saw assembly 100 from entering the coil wires of the flexible shaft 170.

Referring again to FIG. 3, a second end 167 of the flexible shaft 170 is fixedly attached to the second hub member 164 such that rotation of the second end causes rotation of the second hub member 164. The second hub member 164 is connected to the vertical movement subassembly 180, which includes an elongated externally threaded screw member 182 (which can also be referred to as an output member), an internally threaded nut member 184 (which can also be referred to as a translation member), guide rods 186, and guide sleeves 190. The second hub member 164 is fixedly attached to the bottom end of the externally threaded screw member 182 and is configured to rotate with the externally threaded screw member 182.

In the embodiment illustrated in FIGS. 3-5, the second hub member 164 is fixed to the screw member 182 with a threaded member 165 of the second hub member 164 that is fixedly screwed into the externally threaded screw member 182. In other embodiments, the second pin gear 170 may be fixed to the screw member 182 with a pin similar to the pin 163 described above, welded to the screw member 182, or fixed to the screw member 182 in another suitable manner. The reader should appreciate that the second hub member 164 may rotate at the same or different rotational speed as compared to the externally threaded screw member 182 and the second rotational axis B may differ from the rotational axis of the externally threaded screw member 182.

The externally threaded screw member 182 includes a cylindrical shaft having external threads on an outer surface of the cylindrical shaft. The externally threaded screw member 182 is oriented vertically and is arranged so as to run parallel to the outer surface of the undercarriage 124 and perpendicular to the top surface 110 of the main table 108. The length of the externally threaded screw member 182 is at least equal to the distance by which the circular saw blade 129 can be raised or lowered. However, in other embodiments, the screw member 182 may have a different height as desired for alternative requirements of the height adjustment assembly 130.

With continuing reference to FIG. 3, the externally threaded screw member 182 is vertically oriented relative to the outer surface of the undercarriage 124 such that the second rotational axis B of the second hub member 164 is substantially perpendicular to the first rotational axis A of the first hub member 162. The flexible shaft 170 is bent axially at an angle of ninety (90) degrees between the first hub member 162 and the second hub member 164.

Referring now to FIGS. 2 and 3, the guide rods 186 are fixed with respect to the undercarriage 124 and arranged in a vertical orientation. The motor 128 includes guide sleeves 190 that extend outwardly from opposite sides of the motor 128 and that are each configured to encompass a respective guide rod 186 so as to permit the motor 128 to slide along the path of the guide rods 186 in the vertical direction H.

The motor 128 further includes an internally threaded nut member 184 that is fixedly coupled to the motor 128 on a side of the motor 128 facing the externally threaded screw member 182. Interior threads of the internally threaded nut member 184 engage the external threads of the externally threaded screw member 182 such that rotation of the externally threaded screw member 182 causes the internally threaded nut member 184, and thus the motor 128, to move vertically along the length of the externally threaded screw member 182.

In the illustrated embodiment, the first rotational direction R of the flexible shaft 170 coincides with the direction of rotation of the screw member 182 that causes the motor 128 to move upwardly in the vertical direction. A maximum torsional stiffness of the flexible shaft 170 is achieved when the shaft 170 is rotated in a direction that causes the outermost coil layer (second coil layer 176 as illustrated in FIGS. 6A and 6B) to contract. Therefore, since more torsional strength is required to lift the motor 128 than to lower the motor 128, in the illustrated embodiment, the first rotational direction R of the flexible shaft 170 rotates in the same direction as the direction of rotation of the screw member 182 that causes lifting of the motor 128. However, in other embodiments, the flexible shaft 170 may rotate in the opposite direction.

In operation, the height adjustment assembly 130 raises and lowers the height of the circular saw blade 129 with respect to the upper surface 110 of the main table 108. In order to operate the height adjustment assembly 130, a user first rotates the height adjustment wheel 134 either via the rotatable handle portion 136 or by directly engaging the height adjustment wheel 134. Rotation of the height adjustment wheel 134 causes the rod 144 to rotate, which in turn rotates the first hub member 162. The rotation of the first hub member 162 causes the first end 166 of the flexible shaft 170 to rotate about the first rotational axis A. Due to the clamping force of the coil layers 172, 176, the rotation of the first end 166 of the flexible shaft 170 about the first rotational axis A causes rotation of the second end 167 of the flexible shaft 170 about the second rotational axis B. The rotation of the second end 167 causes rotation of the second hub member 164.

The rotation of the second hub member 164 about the second rotational axis B causes rotation of the externally threaded screw member 182 within the internally threaded nut member 184. Since the motor 128 is fixedly coupled to the internally threaded nut member 184, rotation of the externally threaded screw member 182 within the internally threaded nut member 184 causes the motor 128, and thus the circular saw blade 129, to raise and lower on the guide rods 186 with respect to the table saw assembly 100. Therefore, rotating the height adjustment wheel 134 raises and lowers the motor 128 and the circular saw blade 129 operatively attached to the motor 128 with respect to the table saw assembly 100.

Figure 7:
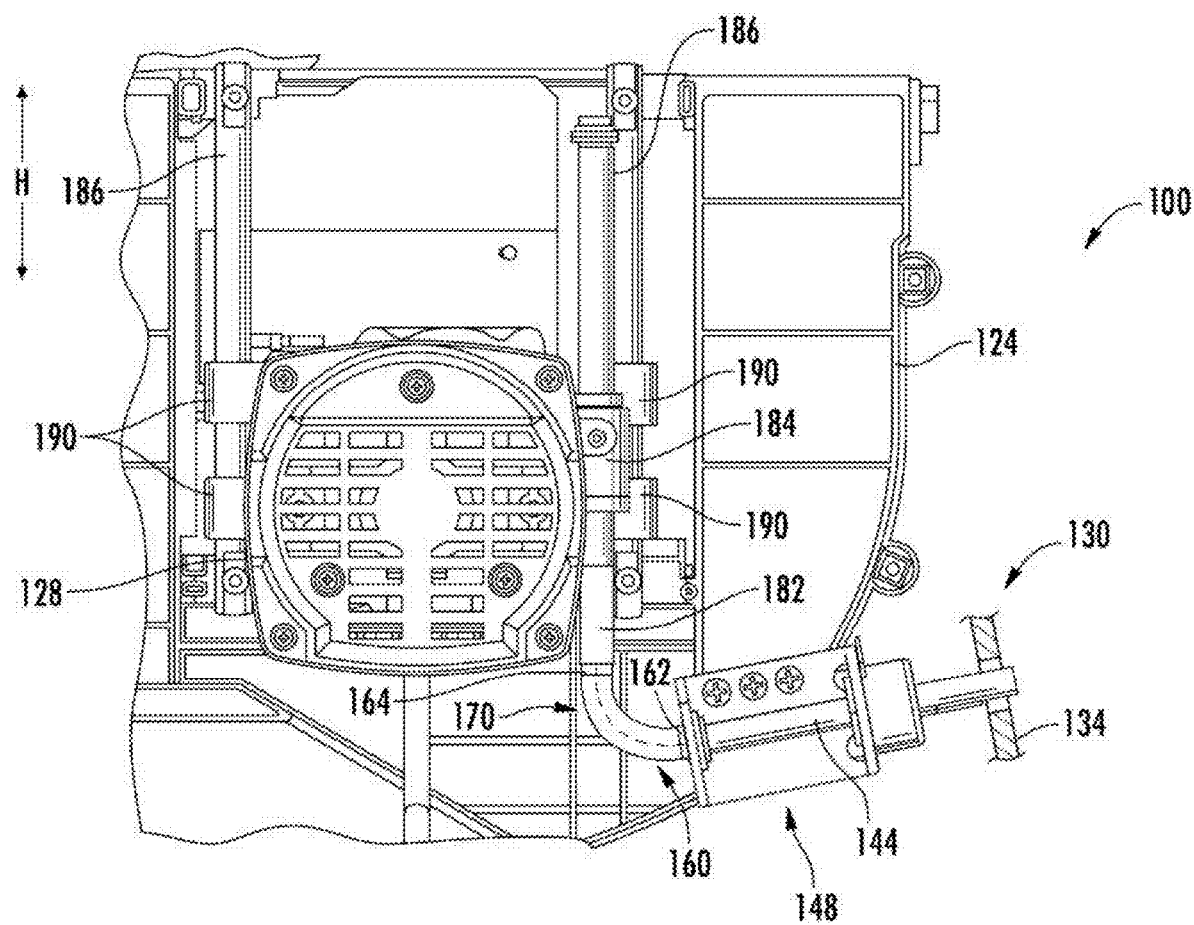
FIG. 7 is a side elevation view of the saw blade height adjustment mechanism of the table saw assembly of FIG. 1 having another shaft arrangement.

FIG. 7 illustrates the horizontal rod subassembly 140 and the flexible shaft subassembly 160 of the table saw assembly 100 in another arrangement. The components of the horizontal rod subassembly 140, in particular the rod 144, the mounting plate 148, and the height adjustment wheel 134, are mounted parallel to the undercarriage 124 and at an angle of sixty (60) degrees to eighty (80) degrees relative to the vertical movement subassembly 180. The flexible shaft 170 is bent axially at an angle of sixty (60) degrees to eighty (80) degrees between the first hub member 162 and the second hub member 164. Because the flexible shaft 170 is capable of bending axially while maintaining torsional stiffness, the rotation of the height adjustment wheel 134 causes substantially the same amount of lifting force on the motor 128 in the embodiment of FIGS. 2 and 3.

The reader should appreciate that the flexible shaft 170 is capable of fully transferring rotational motion regardless of the bending angle the shaft 170. Thus, the shaft 170 may be bent at an angle of zero (0) degrees such that the two hub members 162, 164 face the same direction, straightened to an angle of one hundred and eighty (180) degrees such that the two hub members 162, 164 face opposite directions, and any angle in between zero (0) and one hundred and eighty (180) degrees. As a result, the horizontal rod subassembly 140, and in particular the height adjustment wheel 134, may be positioned in any desired location on the table saw assembly 100, thus greatly increasing the range of possible design choices for the height adjustment assembly 130 of the table saw assembly 100 so as to meet the needs of virtually any potential user and table configuration.

For example, in one embodiment, the horizontal rod subassembly 140 and the flexible shaft subassembly 160 are oriented similar to the embodiment shown in FIG. 7, but at an angle of twenty (20) degrees to forty (40) degrees instead of an angle between sixty (60) degrees to eighty (80) degrees. Thus, the height adjustment wheel 134 is oriented slightly higher relative to the main table 108 as compared to the embodiments illustrated in FIGS. 3 and 7. In a further embodiment, the horizontal rod subassembly 140 and the flexible shaft subassembly 160 are oriented perpendicular to the vertical movement subassembly 180 and perpendicular to the outer surface of the undercarriage 124, such that the height adjustment wheel 134 is located on a side surface of the base frame 104 as opposed to protruding through the front surface 118, as illustrated in FIGS. 1-4. The reader should appreciate that the vertical movement subassembly 180 may be oriented in any suitable position such that the motor 128 may be raised or lowered in a direction relative to the undercarriage 124 other than the vertical direction H.

Figure 8:
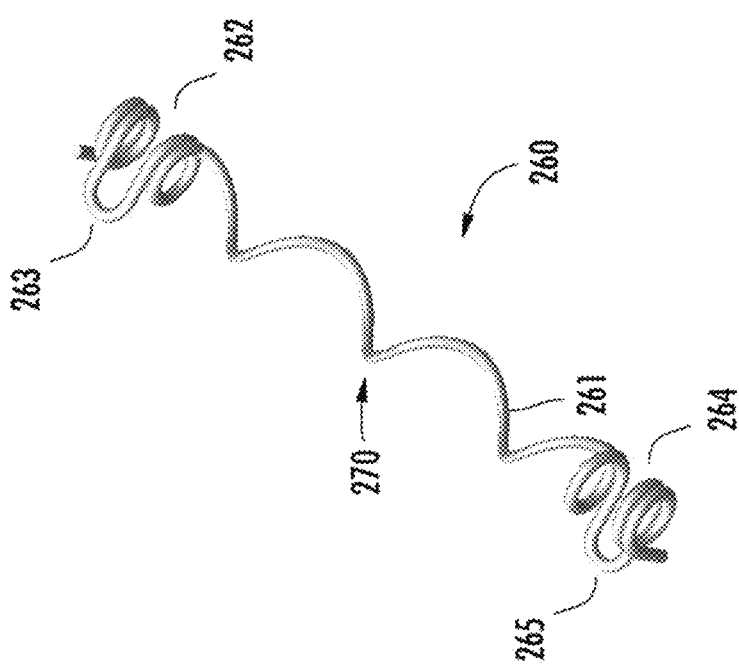
FIG. 8 is a perspective view of another flexible shaft of the saw blade height adjustment mechanism of FIG. 3.

FIG. 8 illustrates a flexible shaft 260 of the table saw assembly 100 that is used in place of the flexible shaft subassembly 160 of the embodiment of FIGS. 1-7. The flexible shaft 260 includes a main wire 261 defining a first clamp coil 262, a second clamp coil 264, and a plurality of coils 270. The flexible shaft 260 is capable of bending similarly to the manner in which the flexible shaft subassembly 160 bends, thus allowing the horizontal rod subassembly 140 to be oriented in a variety of positions.

The main wire 261 forms the entirety of the flexible shaft 260 and is wound so as to form the first and second clamp coils 262, 264 and the plurality of coils 270. The first and second clamp coils 262, 264 are formed on opposite ends of the plurality of coils 270. In the illustrated embodiment, the first and second clamp coils 262, 264 are identical and each include three (3) helical coils and a lever portion 263, 265, respectively. In some embodiments, the first and second clamp coils 262, 264 include more or less than three coils, so long as the clamp coils 262, 264 include at least one and a quarter (1.25) coils. The reader should appreciate that extra coils beyond one and a quarter (1.25) reduces stress on the flexible shaft 260.

As is shown in FIG. 8, the lever portions 263, 265 are parallel to each other, extend tangentially in the same radial direction from the coils, and are formed on opposite sides of the circumferences of the first and second clamp coils 262, 264. The first and second clamp coils 262, 264 are fixedly attached to the rod 144 and the screw member 182, respectively, and may be attached directly onto the rod 144 and the screw member 182 via the clamp coils 262, 264, or by using one of the fastening methods described above.

A plurality of elongated coils 270 is formed between the first and second clamp coils 262, 264. In the illustrated embodiment, the plurality of elongated coils 270 includes three (3) helical coils, although in other embodiments, the plurality of elongated coils 270 includes more or less than three (3) helical coils depending on the requirements of the table saw assembly 100. The reader should appreciate that fewer coils in the plurality of elongated coils achieves a greater torsional stiffness in the flexible shaft 260.

While the coils of the first and second clamp coils 262, 264 are wound tightly so as to be adjacent to one another, the plurality of elongated coils 270 have larger inner coil diameters and are stretched in the axial direction. As a result, there is a gap between each coil of the plurality of elongated coils 270. In the embodiment illustrated in FIG. 8, the inner coil diameter of each coil of the plurality of elongated coils 270 is four times greater than a wire diameter of the main wire 261, although in other embodiments the inner coil diameter of the coils 270 is greater than four times the wire diameter of the main wire 261.

The flexible shaft 260 may optionally be covered with an outer sleeve 179 (not shown in FIG. 8). The outer sleeve 179 prevents dust and debris caused by a machining process of the table saw assembly 100 from entering the coil wires of the flexible shaft 260.

Similar to the flexible shaft subassembly 160 described above, the flexible shaft 260 can be arranged in a variety of configurations to allow the horizontal rod subassembly 140, and thus the height adjustment wheel 134, to be arranged according to virtually any user's needs or any positioning requirements of the table saw assembly 100.

Figure 9:
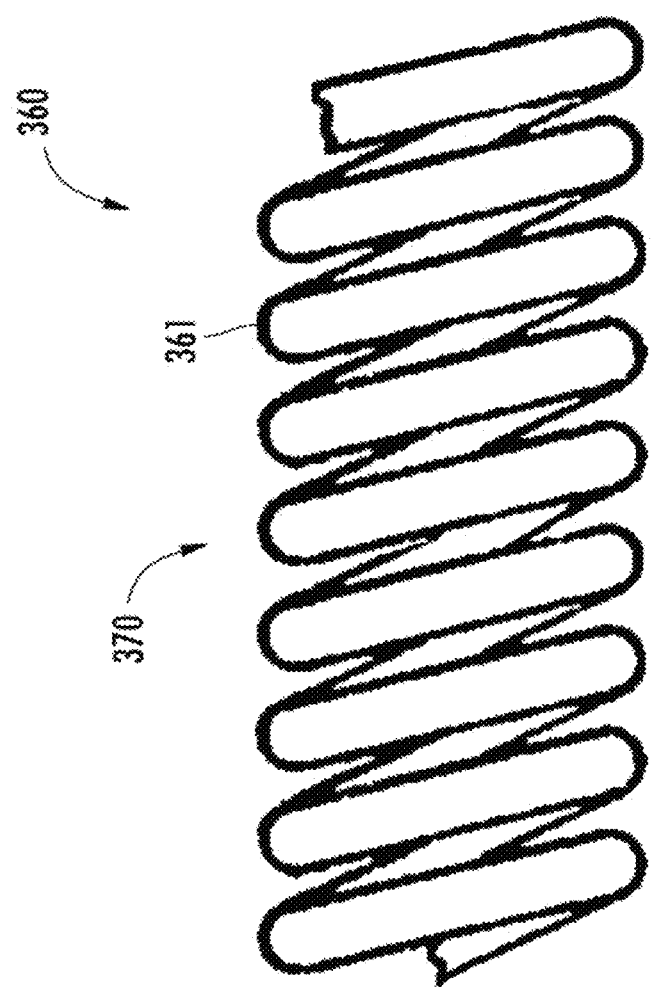
FIG. 9 is a side elevation view of another flexible shaft of the saw blade height adjustment mechanism of FIG. 3.

FIG. 9 illustrates a flexible shaft 360 of the table saw assembly 100 that is used in place of the flexible shaft subassembly 160 and the flexible shaft 260 of the embodiments of FIGS. 1-8. The flexible shaft 360 includes a main wire 361 defining a plurality of coils 370. The flexible shaft 360 is capable of bending similarly to the manner in which the flexible shaft subassembly 160 and the flexible shaft 260 bend, thus allowing the horizontal rod subassembly 140 to be oriented in a variety of positions.

The main wire 361 forms the entirety of the flexible shaft 360 and is wound so as to form the plurality of coils 370. In the illustrated embodiment, the plurality of coils 370 includes nine (9) helical coils, each having an inner coil diameter that is three times greater than a wire diameter of the main wire 361, although in other embodiments the ratio between the wire diameter of the main wire 361 and the inner coil diameter of the coils 370 is different. The reader should appreciate that when using the flexible shaft 360 having a would helical coil shaft, torsional stiffness is achieved when the ratio between the inner coil diameter of the coils 370 and the wire diameter of the main wire 361 is relatively low, such as three to one (3:1) as shown in the illustrated embodiment. Lower ratios will provide greater torsional stiffness. Torsional stiffness is also increased when the plurality of coils 270 includes a low total number of coils, for example the nine (9) coils shown in the illustrated embodiment. Accordingly, the flexible shaft 360 may be configured to meet a wide variety of torsional strength and size requirements of the table saw assembly 100.

The flexible shaft 360 may optionally be covered with an outer sleeve 179 (not shown in FIG. 9). The outer sleeve 179 prevents dust and debris caused by a machining process of the table saw assembly 100 from entering the coil wires of the flexible shaft 360.

Similar to the flexible shaft subassembly 160 and the flexible shaft 260 described above, the flexible shaft 360 can be arranged in a variety of configurations to allow the horizontal rod subassembly 140, and thus the height adjustment wheel 134, to be arranged according to virtually any user's needs or any positioning requirements of the table saw assembly 100.

Figure 10:
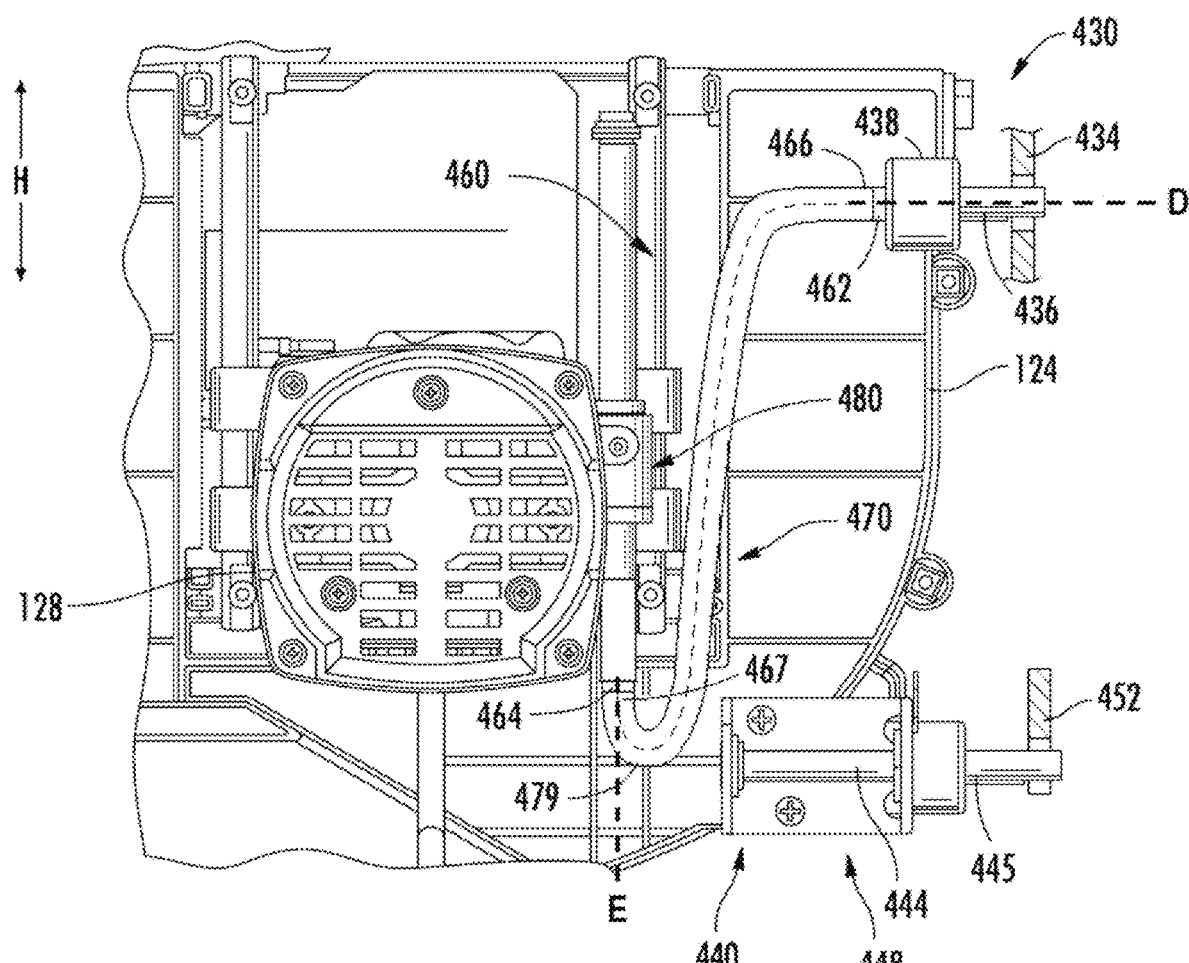
FIG. 10 is a side elevation view of the saw blade height adjustment mechanism of the table saw assembly of FIG. 1 having another shaft arrangement.

FIG. 10 illustrates a height adjustment mechanism 430 of the table saw assembly 100 that is used in place of the height adjustment assembly 130 of the embodiments of FIGS. 1-7. The height adjustment mechanism 430 includes a height adjustment wheel 434, a mounting rod 436, a mounting member 438, a bevel adjustment subassembly 440, a flexible shaft subassembly 460, and a vertical movement subassembly 480. The height adjustment mechanism 430 is similar to the height adjustment mechanism 130 described above, but includes an assembly configured to adjust the height of the motor 128 that is separate from the assembly configured to adjust the bevel angle of the undercarriage 124.

The bevel adjustment subassembly 440 is similar to the horizontal rod subassembly 140 describe above but does not connect to the flexible shaft subassembly 460. The bevel adjustment subassembly 440 includes a rod 444, a mounting plate 448, and a bevel adjustment handle 452. The rod 444 is rotatably supported by the mounting plate 448 and includes an exterior end 445 on which the bevel adjustment handle 452 is mounted. The mounting plate 448 is securely fastened to the undercarriage 124 with screws or other suitable fasteners. The rod 444 extends in a horizontal axial direction through a rod bearing hole defined in an outermost side of the mounting plate 448. The exterior end 445 of the rod 444 protrudes beyond the outermost side of the mounting plate 448 and through the arc-shaped aperture 116 of the base frame 104.

As illustrated in FIG. 10, the rod 444 is fixed within the mounting plate 448 such that the rod 444 does not rotate. As such, a user can adjust the bevel angle of the undercarriage 124 via lateral movement of a bevel adjustment handle 452 without rotation of the rod 444 or handle 452. In other embodiments, the rod 444 is rotatable similar to the rod 144 described above, and as a result, the bevel adjustment handle 452 is rotatable as well. In this embodiment, the bevel adjustment handle 452 may be configured as a wheel, similar to the height adjustment wheel 134 described above. In some embodiments, rotation of the bevel adjustment handle 452 or wheel enables easier movement of the bevel adjustment subassembly 440.

The flexible shaft subassembly 460 of the height adjustment mechanism 430 is configured similarly to the flexible shaft subassembly 160, and includes a first hub member 462, a second hub member 464, and a flexible shaft 470 having a first end 466 and a second end 467. In the illustrated embodiment, the flexible shaft 470 includes the multiple layer helical coil configuration described above with regard to the flexible shaft 170, although in other embodiments, the flexible shaft 470 may be configured similarly to the flexible shafts 260, 360. The flexible shaft subassembly 460 also includes an outer sleeve 479 similar to the outer sleeve 179 described above.

As shown in FIG. 10, the flexible shaft 470 is bent to run nearly vertically from the second hub member 464 to the first hub member 462. The first hub member 462 is fixedly attached, via the fastening methods described above or any other suitable fastening method, to the mounting rod 436. The mounting rod 436 is rotatably mounted within the mounting member 438, and extends through and protrudes outwardly from the mounting member 438. The height adjustment wheel 434 is fixedly attached to the outermost end of the mounting rod 436 such that rotation of the height adjustment wheel 434 causes rotation of the mounting rod 436, which in turn causes rotation of the first hub member 462. As illustrated in FIG. 10, the mounting member 438 is fixedly attached to the undercarriage 124 via a suitable fastening method.

The second hub member 464 is fixedly attached to the vertical movement subassembly 480. The vertical movement subassembly 480 is configured similarly to the vertical movement subassembly 180 in that the vertical movement subassembly 480 transfers rotational movement of the flexible shaft subassembly 460 into vertical movement of the motor 128 and thus the cutting blade 129.

The reader should appreciate that the height adjustment wheel 434, the mounting rod 436, and the mounting member 438 may be arranged in a variety of configurations to allow the height adjustment wheel 434 to be arranged according to virtually any user's needs or any positioning requirements of the table saw assembly 100. Although in the illustrated embodiment the mounting member 438 is fixedly attached to the undercarriage 124, and thus a first rotational axis D of the first end 466 of the flexible shaft 470 intersects a second rotational axis E of the second end 467 of the flexible shaft 470, in other embodiments, the flexible nature of the flexible shaft 470 enables the mounting member 438 to be arranged away from the undercarriage 124 in an easily accessible position. For example, in such other embodiments, the first rotational axis D of the first end 466 is oriented in a different plane than the second rotational axis E of the second end 467 such that the rotational axes D, E do not intersect.

The flexible shafts 170, 260, 360, 470 described above transfer the rotational movement provided by the user operating the handle to the cam mechanism that moves the cutting assembly. Additionally, since the flexible shafts 170, 260, 360, 470 do not have gears, as used in conventional height adjustment mechanisms, there are no interfacing surfaces on which wood chips, dust, and debris can accumulate. Furthermore, because the flexible shafts 170, 470 are covered by an outer sleeve 179, 479, no dust or debris is permitted to enter the coils of the flexible shafts 170, 470, instead falling past the flexible shafts 170, 479. Moreover, even if an outer sleeve 279, 379 is not included with the flexible shafts 260, 360, the large gaps between the coils of the shafts 260, 360 allow for debris particles to easily pass through or around the shafts 260, 360, reducing or eliminating build-up of debris. Thus, the flexible shaft of the table saw 100 does not require cleaning or replacement as often as in conventional table saws. Consequently, the table saw assembly 100 can be operated more efficiently and with reduced maintenance.

The reader should appreciate that, while the height adjustment assembly is described herein on a table saw, the height adjustment assembly may also be used in in other table saw assemblies that require height adjustable saw blades, for example stationary table saws and push-pull table saws.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A table saw, comprising:
a table assembly having a table top surface that defines a blade opening;
a cutting assembly arranged below the table assembly and configured to be movable relative to the table top surface, the cutting assembly including a motor; and
a height adjustment assembly operably connected to the cutting assembly, the height adjustment assembly comprising:
an input member;
an output member operably connected to the cutting assembly and configured such that rotation of the output member causes the cutting assembly to move relative to the table top surface; and
a flexible shaft having a nonlinear central axis, a first end operably connected to the input member, and a second end operably connected to the output member, the flexible shaft configured such that rotation of the input member causes rotation of the first end and the second end of the flexible shaft, and rotation of the second end of the flexible shaft causes rotation of the output member,
wherein the input member is arranged near the table top surface and above the output member and the motor.

2. The table saw of claim 1, wherein:
rotation of the input member causes rotation of the first end of the flexible shaft about a first rotational axis; and
rotation of flexible shaft causes rotation of the second end of the flexible shaft about a second rotational axis.

3. The table saw of claim 2, wherein the first rotational axis is oblique to the second rotational axis.

4. The table saw of claim 2, wherein the first rotational axis and the second rotational axis do not intersect.

5. The table saw of claim 2, further comprising:
a bevel adjustment member configured to adjust a bevel angle of the cutting assembly, wherein the first rotational axis is spaced apart from the bevel adjustment member.

6. The table saw of claim 2, further comprising:
a base frame defining an enclosure space in which the cutting assembly is arranged,
wherein the input member protrudes outside of the enclosure space.

7. The table saw of claim 6, wherein the height adjustment assembly includes an adjustment wheel operably connected to the input member and located outside of the enclosure space, the height adjustment wheel configured for manual operation to rotate the input member.

8. The table saw of claim 1, wherein the first end of the flexible shaft is fixedly attached to the input member and the second end is fixedly attached to the output member.

9. The table saw of claim 1, wherein the cutting assembly includes a translation member operably connected to the output member and configured to convert the rotation of the output member into translational movement of the cutting assembly.

10. The table saw of claim 1, wherein:
the flexible shaft includes:
a central wire extending from the first end to the second end of the flexible shaft;
at least one first plurality of coils wound around the central wire in a first winding direction; and
at least one second plurality of coils wound around the at least one first plurality of coils in a second winding direction.

11. The table saw of claim 10, wherein:
the at least one first plurality of coils is right-hand wound, and the at least one second plurality of coils is left-hand wound;
rotation of the flexible shaft causes the at least one first plurality of coils to generate a clamping force on the primary central wire; and
rotation of the flexible shaft causes the at least one second plurality of coils to generate a clamping force on the at least one first plurality of coils.

12. The table saw of claim 1, wherein:
the flexible shaft includes a first plurality of coils; and
the first plurality of coils includes:
a first plurality of clamping coils wound at a first end region of the flexible shaft and having a first inner coil diameter;
a second plurality of clamping coils wound at a second end region of the flexible shaft and having a second inner coil diameter; and
a plurality of elongated coils wound between the first plurality of clamping coils and the second plurality of clamping coils, the plurality of elongated coils having a third inner coil diameter that is greater than the first and second inner coil diameters.

13. A height adjustment assembly for a table saw, comprising:
an input member;
an output member operably connected to a cutting assembly of the table saw and configured such that rotation of the output member causes the cutting assembly to move relative to a table top surface of the table saw; and
a flexible shaft having a nonlinear central axis, a first end operably connected to the input member, and a second end operably connected to the output member, the flexible shaft configured such that rotation of the input member causes rotation of the first end and the second end of the flexible shaft, and rotation of the second end of the flexible shaft causes rotation of the output member,
wherein the input member is arranged near the table top surface and above the output member and a motor of the cutting assembly.

14. The height adjustment assembly of claim 13, wherein:
rotation of the input member causes rotation of the first end of the flexible shaft about a first rotational axis; and
rotation of flexible shaft causes rotation of the second end of the flexible shaft about a second rotational axis that is not parallel to the first rotational axis.

15. The height adjustment assembly of claim 14, wherein the first rotational axis is oblique to the second rotational axis.

16. The height adjustment assembly of claim 14, wherein the first rotational axis and the second rotational axis do not intersect.

17. The height adjustment assembly of claim 14, further comprising:
a bevel adjustment member configured to adjust a bevel angle of the cutting assembly, wherein the first rotational axis is spaced apart from the bevel adjustment member.

18. The height adjustment assembly of claim 13, wherein:
the flexible shaft includes:
a central wire extending from the first end to the second end of the flexible shaft;
at least one first plurality of coils wound around the central wire in a first winding direction; and
at least one second plurality of coils wound around the at least one first plurality of coils in a second winding direction.

19. The height adjustment assembly of claim 18, wherein:
rotation of the flexible shaft causes the at least one first plurality of coils to generate a clamping force on the primary central wire; and
rotation of the flexible shaft causes the at least one second plurality of coils to generate a clamping force on the at least one first plurality of coils.

20. A method for adjusting a height of a cutting assembly of a table saw, comprising:
rotating an input member of a height adjustment assembly of the table saw so as to cause rotation of a first end and a second end of a flexible shaft of the height adjustment assembly, the flexible shaft having a nonlinear central axis, the first end operably connected to the input member;
rotating an output member, which is operably connected to the second end of the flexible shaft, via the rotation of the second end of the flexible shaft, wherein the input member is arranged near the table top surface and above the output member and a motor of the cutting assembly; and moving the cutting assembly, which is operably connected to the output member, relative to a table top surface of the table saw via the rotation of the output member.

\* \* \* \* \*